[19] United States Patent
Ni et al.

(10) Patent No.: US 8,605,996 B2
(45) Date of Patent: Dec. 10, 2013

(54) SENTIMENT CLASSIFICATION USING OUT OF DOMAIN DATA

(75) Inventors: Xiaochuan Ni, Beijing (CN); Gang Wang, Beijing (CN); Jian-Tao Sun, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1059 days.

(21) Appl. No.: 12/336,137

(22) Filed: Dec. 16, 2008

(65) Prior Publication Data

US 2010/0150393 A1    Jun. 17, 2010

(51) Int. Cl.
*G06K 9/62* (2006.01)
*G06K 9/00* (2006.01)

(52) U.S. Cl.
USPC .......................................................... 382/159

(58) Field of Classification Search
USPC ......... 382/100, 159, 190, 218–220, 224, 225; 706/12, 54; 704/5, 9
See application file for complete search history.

(56) References Cited

U.S. PATENT DOCUMENTS

| | | | |
|---|---|---|---|
| 2006/0200341 A1 | 9/2006 | Corston-Oliver et al. | |
| 2008/0249764 A1* | 10/2008 | Huang et al. | 704/9 |
| 2010/0150393 A1* | 6/2010 | Ni et al. | 382/100 |
| 2010/0312725 A1* | 12/2010 | Privault et al. | 706/12 |

OTHER PUBLICATIONS

Andreevskaia et al., "When Specialists and Generalists Work Together: Overcoming Domain Dependence in Sentiment Tagging" retirved on Nov. 21, 2008 at <<http://www.aclweb.org/anthology-new/P/P08/P08-1034.pdf>>, Proceedings ACL-08 HLT, 2008, pp. 290-298.
Aue et al., "Customizing Sentiment Classifiers to New Domains: A Case Study", 2005, RANLP 05, Intl Conf on Recent Advances in Natural Language Processing, 7 pgs.
Pan et al., "A Survey on Transfer Learning" retrived on Nov. 21, 2008 at http://www.cse.ust.hk/~sinnopan/publications/TLsurvey_0822.pdf, Nov. 2008, pp. 1-26.
Sood, et al., "Reasoning through Search: A Novel Approach to Sentiment Classification" retrived on Nov. 21, 2008 at <<http://www.cs.northwestern.edu/~pardo/courses/eecs349/papers/sentiment-classification.pdf>>, submitted to EMNLP, Jul. 2006, 7 pgs.
Whitehead et al.,"Building a General Purpose Cross-Domain Sentiment Mining Model", retrived on Nov. 21, 2008 at http://www.cs.indiana.edu/~mewhiteh/files/cross_domain_training.pdf, Technical Paper, 2008, 8 pgs.
Xue, et al, "Topic-Bridged PLSA for Cross-Domain Text Classification", retrieved on Nov. 21, 2008 at http://www.cse.ust.hk/~qyang/Docs/2008/fp352-xue.pdf>>, Proceedings 31st Annual ACM SIGIR conf on Reseach and Development in Information Retrieval, Jul. 2008, ACM, 8 pgs.

* cited by examiner

*Primary Examiner* — Amir Alavi
(74) *Attorney, Agent, or Firm* — Lee & Hayes, PLLC (57) ABSTRACT

Providing sentiment classification of out of domain data are disclosed herein. In some aspects, a source domain having a trained classifier is matched to a target domain having a target classifier. The trained classifier may include identifiers that may be used to predict the sentiment of opinion data for the source domain. The target classifier may use the identifiers of the trained classifier to determine the sentiment of opinion data for the target domain.

20 Claims, 9 Drawing Sheets

SENTIMENT CLASSIFICATION USING OUT OF DOMAIN DATA

BACKGROUND

There are many ways for people to express opinions, submit feedback, or otherwise comment on various products, services, events, or other happenings. For example, with the popularity of Web 2.0 applications, an increasing number of people provide opinion data for others to consume. In addition to traditional forms of communication, many people contribute such opinion data via online forums, web blogs, and customer reviews, which provide a great wealth of information. Customer opinions are particularly valuable because they are often perceived to provide practical information about a subject, thus often being absent of puffery that may be used by companies when discussing their products and services. In addition, customer opinions typically include both positive and negative aspects of products and services which result in diverse opinion data.

It is often difficult to navigate through the vast amount of opinion data made available to customers, such as via the Internet. For example, a particular product may have hundreds of reviews, of which only a summary may be of particular interest to another customer. It is important to be able to sort through this information to organize people's opinions and perform analysis on the opinion data. This may result in better understanding of the wealth of information that makes up the opinion data.

One way to sort through the opinion data is to have humans manually categorize each entry into a number of logical categories that helps customers navigate though the data. For example, opinion data may be categorized as being a positive or negative opinion data. In addition, the opinion may be related to a particular product or service category and possibly further linked to subcategories. However, human categorization is very time consuming and expensive. Another way to categorize information is by requiring the author of the review to provide category information when the opinion data is generated. Although this may work very well in some instances, such as by asking a customer to rank the product (e.g., via stars, a numerical value, etc.) when submitting a customer review, this may not be available for all sources opinion data, such as forums, blogs, etc.

SUMMARY

Techniques of sentiment classification of out of domain data are disclosed herein. Classifiers may be used to categorize data based on predetermined criteria and are tailored to operate for a particular domain of data. In some aspects, a source domain having a trained classifier is matched to a target domain having a target classifier. The trained classifier includes identifiers that may be used to predict the sentiment of opinion data for the source domain. The target classifier may use the identifiers of the trained classifier to determine the sentiment of opinion data for the target domain.

In other embodiments, the target classifier may use the identifiers to analyze opinion data and locate secondary identifiers, which have a strong correlation to the sentiment of the opinion data of the target domain. The secondary identifiers may be assigned a weight that is different than a weight assigned to the identifiers from the source domain.

In still further embodiments, the target classifier may include opinion data with a predetermined (known) sentiment. The target classifier may be used to evaluate the opinion data with the predetermined sentiment to determine whether the identifiers have sentiment prediction capabilities within the target domain. Some identifiers may be removed when they are determined to be inaccurate at predicting the predetermined sentiment of opinion data with the known sentiment.

This summary is provided to introduce simplified concepts of sentiment classification using out of domain data, which is further described below in the Detailed Description. This summary is not intended to identify essential features of the claimed subject matter, nor is it intended for use in determining the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The same reference number in different figures refers to similar or identical items.

DETAILED DESCRIPTION

Overview

Classifying large amounts of data is important to enable customers to quickly extract useful information from large quantities of textual information. A vast quantity of textual information that contains people's opinions (i.e., opinion data) is currently available, while additional textual information is relatively inexpensive and easy to obtain. It is desirable to automate classification of the opinion data before it becomes obsolete while minimizing costs and use of resources.

Trained domain classifiers enable automatic classification of opinion data for a particular domain. To maintain a high level of accuracy in classification, classifiers have to be developed for each domain, including new domains and/or subdomains. Techniques to develop trained classifiers for new domains using out of domain data are disclosed herein.

Illustrative Environment

Figure 1:
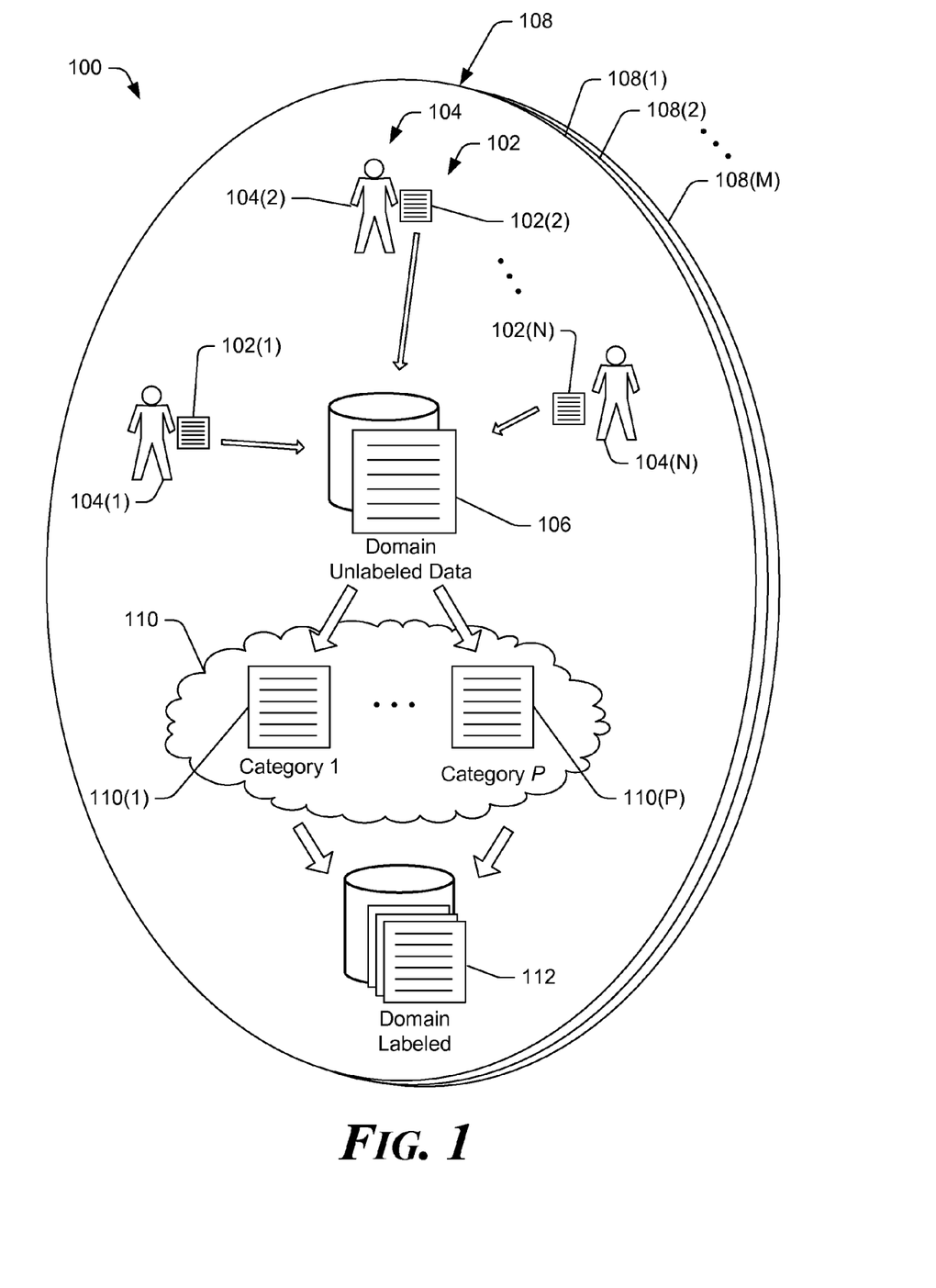
FIG. 1 is a schematic of an illustrative environment of sentiment classification of opinion data using out of domain data.

FIG. 1 is a schematic of an illustrative environment 100 of one or more embodiments of sentiment classification of opinion data using out of domain data. Opinion data 102 may be generated from a variety of sources 104. For example, a first source 104(1) may include a customer that creates opinion data 102(1) in the form of a customer review, blog, forum, survey, or other submission of information. Other sources 104(2), ... 104(N) may include people, entities, etc., that create opinion data 102(2), ..., 102(N), respectively.

The opinion data 102 may be compiled from the sources 104 as a domain of unlabeled data 106. A domain 108 may include a grouping of the opinion data 102 for similar items, services, etc. For example, a first domain 108(1) may be limited to opinion data associated with "computers," a second domain 108(2) may be used for "books" and another domain 108(M) may be used for video games, among the many possibilities of grouping opinion data by a domain. Unlabeled data is opinion data that is not classified. The domain of unlabeled data 106 may include opinion data that is collected from the sources 104. In some embodiments, the opinion data 102 may be obtained from the Internet (or other networks of computers). For example, Internet robots (bots) may be used to collect the opinion data 102 for a particular domain to populate the domain of unlabeled data 106. The bots may be implemented to collect data from e-commerce sites, blogs, forums, or other locations, which often include categories for data that may link to a domain, such as a forum for cameras or a customer review of a camera that link to a domain for cameras.

The opinion data of the domain of unlabeled data 106 may be categorized at a sorting operation 110. Although the disclosure may be used for any type of classification, sentiment classification is used as an illustrative example of one of many possible types of classifications. As such, sentiment classification is used to determine whether opinion data is positive or negative. For example, a sentence of text that describes a customer's opinion of an item may be analyzed to determine if the person liked the item (positive) or disliked the item (negative). In some embodiments, the opinion data may be sorted into one of multiple categories 110(1), ..., 110(P). Once the opinion data from the domain of unlabeled data is sorted, it becomes labeled data and is stored in a domain of labeled data 112.

As shown in the environment 100, the process of collecting opinion data and then categorizing it is conducted for each domain 108 of the many possible domains 108(1)-(M). As further described below, automation of this process for each domain is desirable to more efficiently categorize the opinion data 102 from the sources 104 for each of the domains 108.

Figure 2:
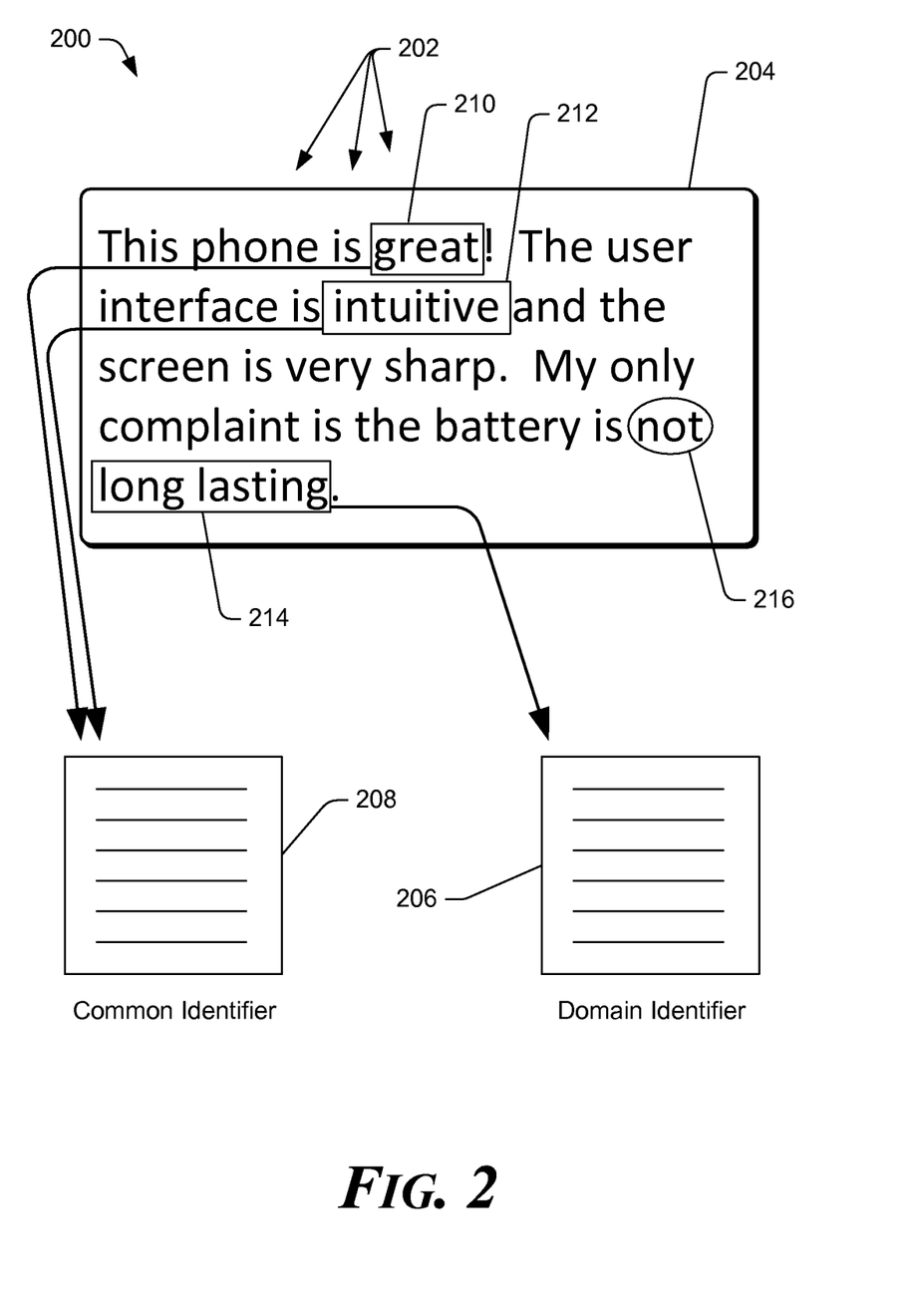
FIG. 2 shows an illustrative classification of opinion data where text of the opinion data may be designated as a common identifier, while other text may be designated as a domain identifier in accordance with some embodiments of the disclosure.

FIG. 2 shows an illustrative classification 200 of opinion data. In accordance with various embodiments, identifiers 202 that may be a collection of characters, text, words, etc., that have a strong correlation to a sentiment classification may be selected from opinion data 204. For example, the term "good" may have a very strong correlation with opinion data that is classified as having a positive sentiment (hereinafter "positive") while the term "bad" may have a very strong correlation with opinion data that is classified as having a negative sentiment (hereinafter "negative"). Each piece of opinion data may have one or more of the identifiers 202 that can be used, along with other attributes of the opinion data 204 (e.g., sentence structure, negation words, etc.) to determine the sentiment of the opinion data.

Some domains may include identifiers that have specific meanings when used within the context of the domain, which are designated as domain identifiers 206. For example, the term "hooked" may be a domain identifier that is a strong predictor of a positive sentiment for a domain of video game (e.g., "I'm hooked on this video game and can't stop playing it."). However, "hooked" may not be a predictor in another domain, such as a domain for computers. In contrast, common identifiers 208 are identifiers that are a consistent predictor of sentiment across many domains. The common identifiers 208 include generic terms which have the same meaning in many domains. For example, the terms "good" and "bad" are common identifiers 208.

As shown in FIG. 2, words from the opinion data 204 may be selected and then designated as either the domain identifier 206 of the common identifier 208. For example, the first identifier 210 "great" and the second identifier 212 "intuitive" may be included in the common identifiers 208 because they have a consistent meaning across multiple domains. The third identifier 214 "long lasting" may be one of the domain identifiers 206 because this term may not be a consistent sentiment predictor in other domains. Finally, cues 216 may be selected that modify (e.g., negate, etc.) the identifiers. For example, the cue 216 "not" is a negating term that makes the domain identifier "long lasting" a negative sentiment.

Figure 3:
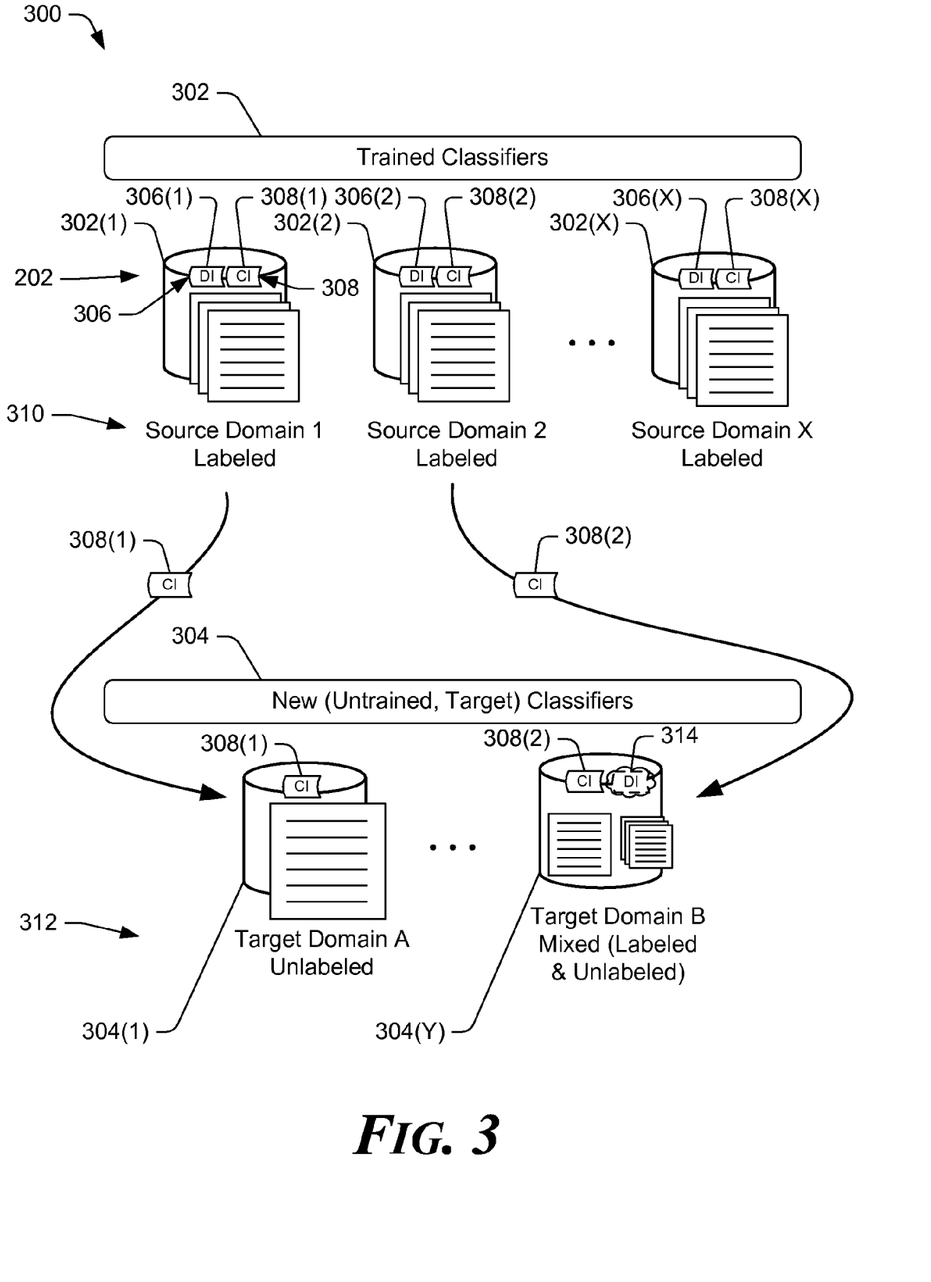
FIG. 3 shows a schematic of illustrative trained classifiers that may be used to train target classifiers in accordance with some embodiments of the disclosure.

FIG. 3 shows illustrative domain classifiers 300 including trained (source) classifiers 302 that may be used to train target (untrained) classifiers 304 in accordance with some embodiments of the disclosure. The domain classifiers 300 may be developed to categorize opinion data in a respective domain based on a detected sentiment. The domain classifiers 300 may systematically, and without human intervention, determine the sentiment of the opinion data, at least in part, by locating the identifiers in the opinion data.

Development of the domain classifiers 300 typically includes multiple processes. Initially, opinion data with a known sentiment (labeled data) is analyzed to determine identifiers. The trained classifiers 302(1), 302(2), ..., 302(X) may include labeled data and the identifiers 202. Each of the trained classifiers is associated with a specific domain. For example, the trained classifier 302(1) may be for the domain "computers," while the trained classifier 302(2) may be for the domain "books." The identifiers include domain identifiers 306 and common identifiers 308.

Next, one of the trained classifiers 302 of a source domain is matched to one of the target classifiers 304 of a target domain. More specifically, a source domain 310 having one of the trained classifiers 302 is selected to train a target domain 312 having one of the target classifiers 304. The selection may compare attributes of the source domain 310 and the target domain 312 to ensure that the trained classifier of the source domain has enough common identifiers that may be used by the target classifier 304 to create accurate sentiment classification of opinion data. The selection may be performed by human selection, machine selection, or a combination of human and machine selection.

In some embodiments, the trained classifier may be carefully selected to match attributes of the target classifier, such that the identifiers associated with the trained classifier are relevant in the target classifier. For example, the trained classifier 302(1) for the domain "computers" may be matched with the target classifier 304(1) for the domain "video games." Similarly, the trained classifier 302(2) for the domain "books" may be matched with the target classifier 304(2) for the domain "magazines." The common identifiers 308 are imported from the trained classifier 302 to the target classifier 304 as shown in FIG. 3.

In accordance with some embodiments, additional processing may occur when the target domain, such as the target domain 304(X), includes labeled data. For example, the target domain 304(X) may include a small sample of labeled data, which may be less than the amount of labeled data that was used to train previous classifiers such as the trained classifiers 302. The target classifier 304(X) may use the common identifiers 308(2) to predict the sentiment of additional unused labeled data during an evaluation process. This enables calibration of the classifier (e.g., addition or reduction of identifiers) to improve designation accuracy. For example, additional domain identifiers 314 may be identified for the target domain 304(X).

Finally, the classifier is designated as a trained classifier upon achieving satisfactory accuracy when determining the sentiment of the evaluation opinion data. Thus, the target domain 304(X), having the labeled data that may be used to calibrate the target domain may provide a more accurate sentiment classifier than the target domain 304(1) which does not include labeled data for evaluation and calibration.

Illustrative Operation

Figure 4:
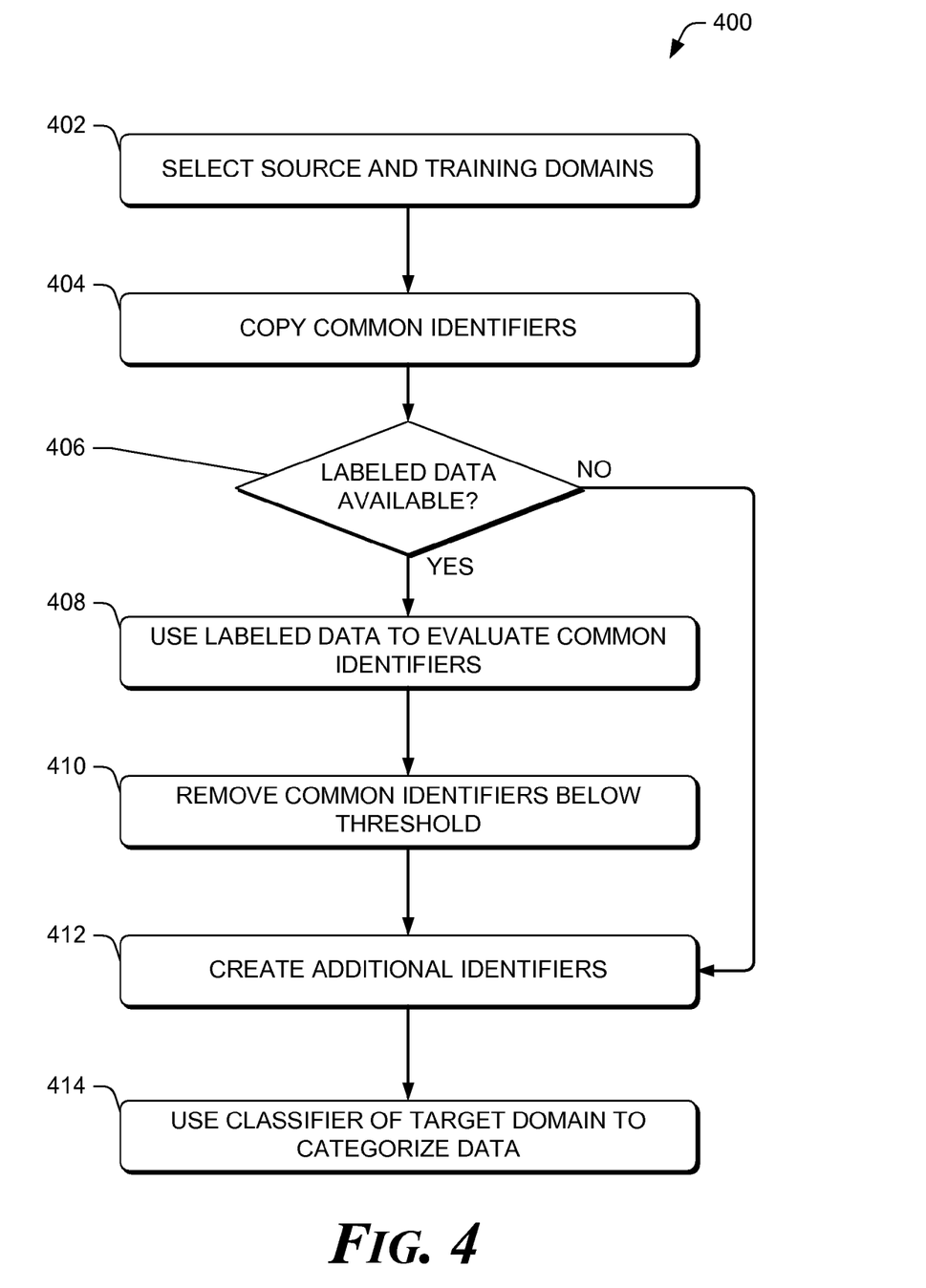
FIG. 4 shows a flow diagram of an illustrative process of selecting a training domain to train a target domain classifier in accordance with various embodiments of the disclosure.

FIG. 4 shows a flow diagram of an illustrative process 400 of selecting a training domain to train a target domain classifier in accordance with various embodiments of the disclosure. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly.

At 402, the source domain 310 and the target domain 312 may be selected (or matched) as described with reference to FIG. 3. The matching may be performed by human selection, machine selection, or a combination of human and machine selection. For example, attributes of the source domain and the target domain may be compared to each other to determine if the source domain is an appropriate source of common identifiers for the target domain.

At 404, the common identifiers are copied from the trained classifier of the trained (source) domain to the target (new) classifier of the target domain. For example, the target classifier may import the common identifiers from the trained classifier using an import utility.

At 406, a decision may be performed to determine whether labeled data is available for the target classifier of the target domain, which may be used to evaluate the target classifier.

If labeled data is available ("yes") at 406, then at 408 the labeled data is used to evaluate the accuracy of the common identifiers used by the target classifier in the target domain.

At 410, common identifiers may be removed from the target classifier to improve accuracy of the sentiment classification.

At 412, additional identifiers may be added to the target classifier to improve accuracy of the sentiment classification. The additional identifiers may be created using auxiliary categorization, as further discussed below.

Finally, at 414, the classifier (now trained) of the target domain may be used to categorize opinion data. For example, as sources (e.g., people, customers, etc.) generate opinion data for the target domain, this classifier may determine the sentiment of the opinion data as positive or negative. In addition, the target domain may be used as a source domain to train another domain, as appropriate when the domain is selected during a matching process as described above. When no labeled data is available at 406, the process may proceed immediately to the operation at 414 to categorize the opinion data.

Figure 5:
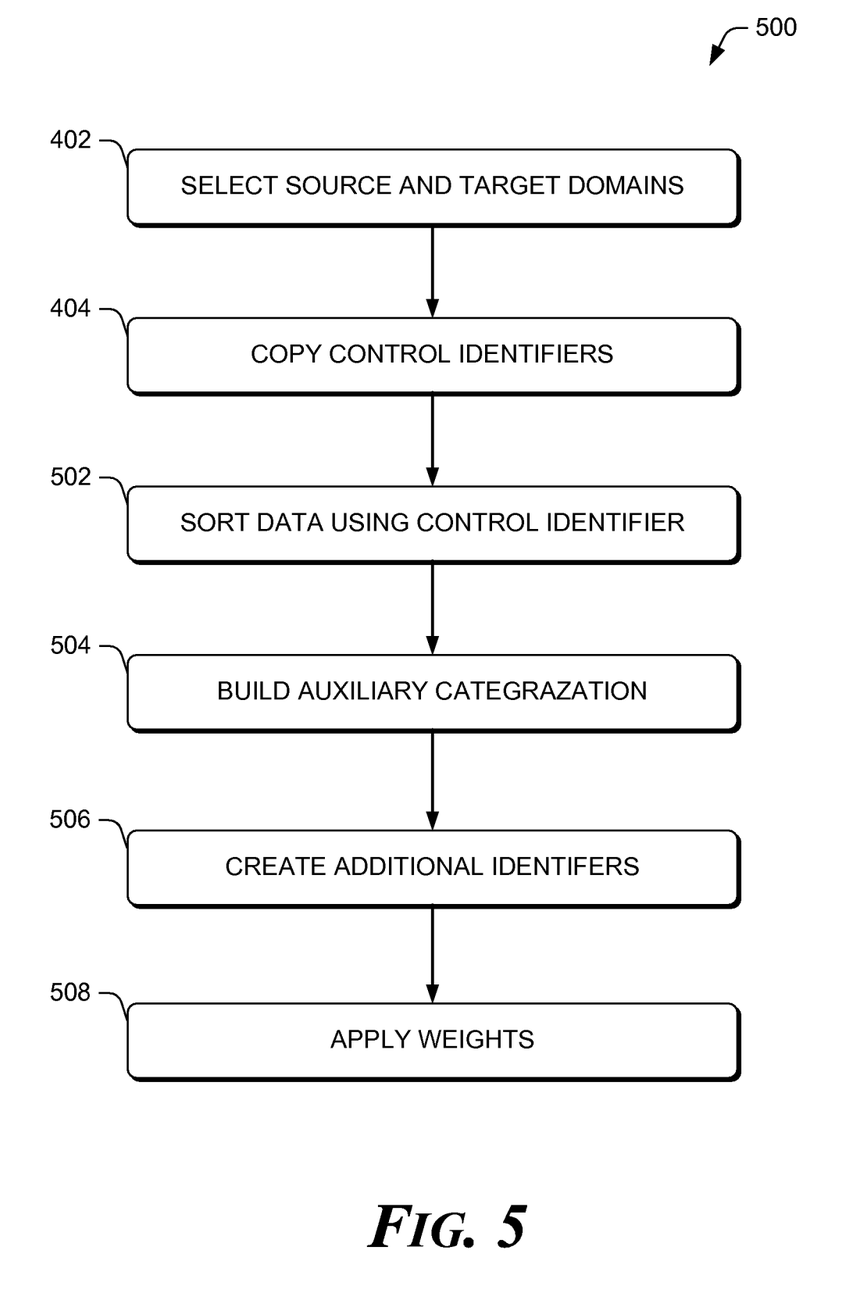
FIG. 5 shows a flow diagram of an illustrative process of providing an auxiliary categorization using control identifiers to locate additional identifiers, each of which are assigned representative weights that are applied when categorizing opinion data.

FIG. 5 shows a flow diagram of an illustrative process 500 of providing an auxiliary categorization. Similar to the process 400, the order of the process 500 is not intended to be construed as a limitation as other configurations of the operations are contemplated. In addition, the process 500 includes the operations 402 and 404 that are described in the process 400. In various embodiments, the auxiliary categorization may be performed using control identifiers to create additional identifiers (i.e., pseudo-common identifiers), each of which are assigned representative weights that are applied when categorizing opinion data.

At 502, opinion data is sorted into two or more categories using the control identifiers. For example, a control identifier of "good" may be used to place opinion data in one of two categories: (1) opinion data that includes the common identifier (inclusive category) and (2) opinion data that does not include the common identifier (exclusive category).

At 504, auxiliary categorization tasks are created to predict the occurrence of control identifiers for previous unseen opinion data. For example, an auxiliary classifier can be trained for predicting the existence of the common identifier "good" using the opinion data of inclusive category and exclusive category.

At 506, the additional identifiers are created using auxiliary categorization. For example, all of the opinion data in the inclusive category may be assumed to have the same sentiment as the control identifier (e.g., "good"=positive sentiment). Next, terms that are frequently included in the inclusive category may be analyzed to determine whether they are good for predicting the occurrence of the common identifier (e.g. "good"). For example, this opinion data may include many instances of the term "fast," which, in context of the target domain (such as computers), may be a positive sentiment. For exemplary opinion data of "The CPU is fast!" where no common identifier exists, the common identifier "good" may be predicted to be in existence by auxiliary categorization. Then a pseudo-common identifier corresponding to "good" is created. Therefore, the additional identifier may enable classification of the data as positive.

At 508, weights may be applied to the common identifiers and the additional identifiers. For example the common identifiers may have a higher weight than the additional identifiers, which creates a greater reliance on the common identifiers to predict the sentiment of opinion data. For example, if a piece of opinion data includes a positive common identifier with a higher weight and a negative additional identifier with a lower weight, the opinion data may be classified as positive because the common identifier has a higher weight, and thus may be more trusted that the additional identifier.

Figure 6:
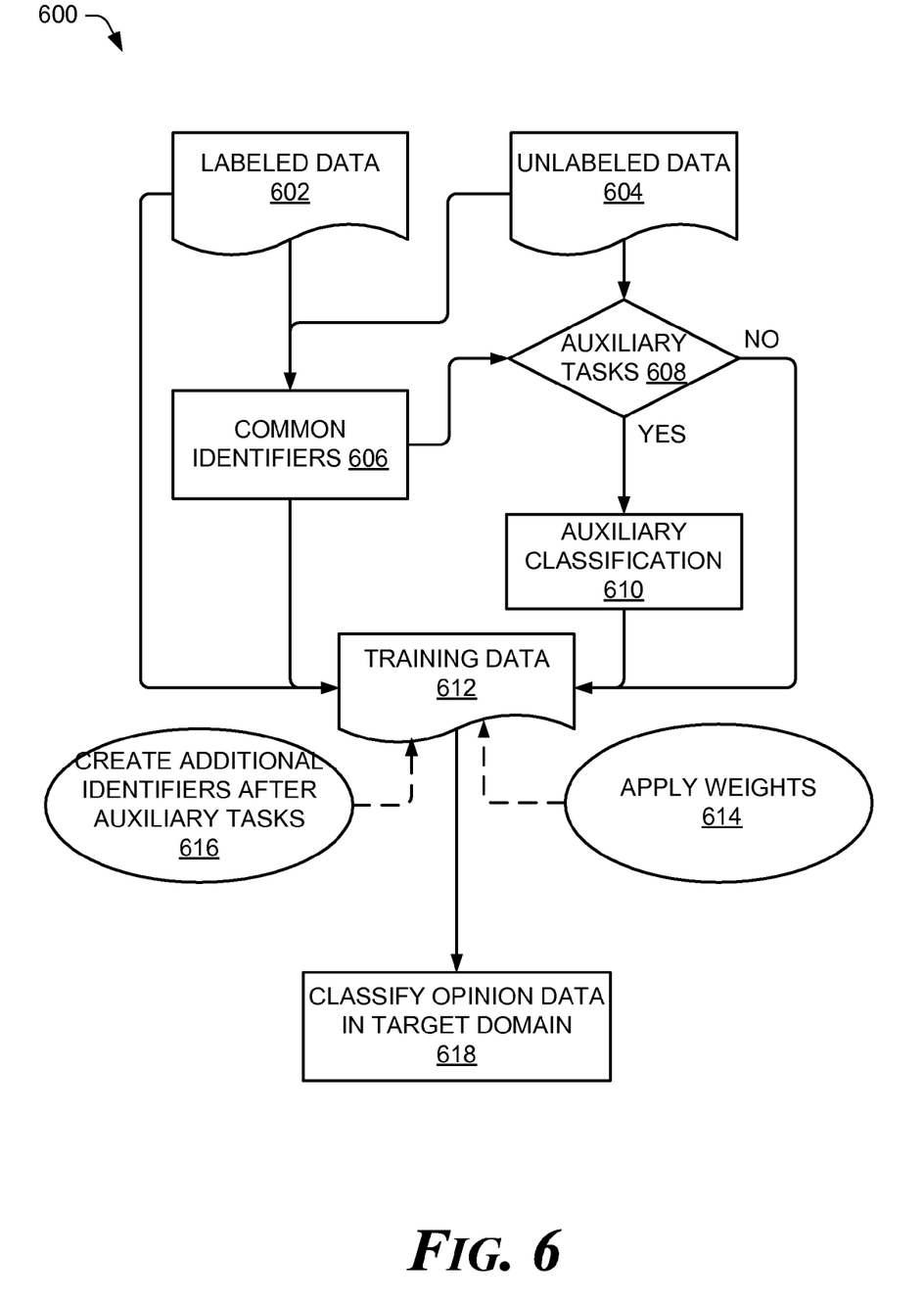
FIG. 6 shows a flow diagram of an illustrative process of providing classification of sentiment data using out of domain data in accordance with various embodiments of the disclosure.

FIG. 6 shows a flow diagram of an illustrative process 600 of providing classification of sentiment data using out of domain data in accordance with various embodiments of the disclosure. Similar to the processes 400 and 500, the arrangement of the process 600 is not intended to be construed as a limitation as other configurations of the operations are contemplated.

In some embodiments, the common identifiers may be created using labeled data 602, unlabeled data 604, or a combination of both from the target domain. There are two application scenarios: The first scenario does not include labeled data of the target domain, which is described with reference to the process 400 where the decision 406 follows the "no" route to the operation 414. The second scenario includes labeled data of the target domain and may include one or more of the operations after the decision 406 when the "yes" route is used. For the second scenario, the labeled data may be combined and analyzed to determine the terms which have good category prediction abilities, which are selected as the identifiers. Next, the terms which have good domain prediction abilities (the domain identifiers) are disregarded, leaving the common identifiers 606, which are selected for use (imported) in the target domain.

In an example, information gain may be employed as a term-goodness criterion. For category prediction, the information gain of a term t is $G_c(t)$, as shown in Equation 1.

$$G_c(t) = -\sum_c p(c)\log p(c) + p(t)\sum_c p(c|t)\log p(c|t) + p(\bar{t})\sum_c p(c|\bar{t})\log p(c|\bar{t}) \quad \text{Equation (1)}$$

where c denotes a category which can be positive or negative. The higher the value of $G_c(t)$ is, the better the category prediction ability of t. Similarly, the discriminative ability among domains of term t is written as $G_d(t)$ in Equation 2.

$$G_d(t) = -\sum_d p(d)\log p(d) + p(t)\sum_d p(d|t)\log p(d|t) + p(\bar{t})\sum_d p(d|\bar{t})\log p(d|\bar{t}) \quad \text{Equation (2)}$$

where d denotes a domain which can be a source domain or the target domain. $G_c(\bullet)$ and $G_d(\bullet)$ are calculated for all terms that occur in the labeled data. Next, the terms that have a relatively higher value of $G_c(\bullet)$ but lower value of $G_d(\bullet)$ (according to predefined thresholds) are selected as the common identifiers 606.

As shown in FIG. 6, auxiliary tasks 608 may be used to further refine classification ability of the target domain. If auxiliary tasks are employed, then an auxiliary classification 610 may be performed using the common identifiers as described with reference to the process 500.

In an example implementation of the auxiliary classification 610, the common identifiers 606 are used to sort opinion data. The auxiliary classification 610 may be trained to predict the existence of the common identifier 606 in a given piece of text content. In this operation, the unlabeled data from target domain is utilized for training. For the common identifier "good," for instance, the opinion data in which the term "good" occurs as positive training samples (inclusive) and the others as negative samples (exclusive). Next, the auxiliary classification may be trained to predict the occurrence of the term "good" given previous unseen content.

The target domain having the target classifier may input, or otherwise receive, generate, or replicate training data 612. For example, the training data may include imported common identifiers 606, additional identifiers created by the auxiliary classification 610, and so forth.

In addition, weights 614 may be applied. For example, the common identifiers may be assigned a higher weight than other identifiers to adjust the influence of the identifiers when implementing the classifier. As an example, given an instance (a piece of textual content), one way is to increase the weights of common identifiers (such as the term frequency weight). Generally, the identifiers are re-weighted for such an instance. Let $\vec{x}$ represent the instance with $\vec{x}=<w_1, w_2, \ldots, w_n>$ where $w_1$ denotes the frequency of term $t_1$, for example "good", occurring in this instance. $\vec{x}$ is replaced by $$\hat{\vec{x}}, \hat{\vec{x}} = \alpha \cdot$$

$\Psi(\vec{x})+(1-\alpha)\cdot\vec{x}$, where $\Psi(\vec{x})$ denotes the transformation of $\vec{x}$ whose components except the ones corresponding to common identifiers are weighted 0. Here, $\alpha$ is a real number that may tune the weights of all identifiers. It can be set to be a number in the range of [0, 1]. The higher the value of $\alpha$ is, the more weight is given to each of the common identifiers 606.

In other embodiments, additional identifiers are created when the auxiliary tasks are used after decision operation 608. This approach may first predict the existence of each common identifier at 616, and then expand the identifier vector, now $$\hat{\vec{x}},$$

by adding N elements (additional identifiers), where N is the number of common identifiers. The weights of new elements are set to be 0 or 1 corresponding to non-existence or existence in terms of the corresponding common identifiers. For example, assuming there are two common identifiers, "good" and "bad" and for instance $\vec{x}$, "good" is predicted to "existence" category and "bad" is predicted to "non-existence" category, then this instance will be represented as $$\langle\hat{\vec{x}}, 1, 0\rangle,$$

with two additional identifiers weighted as 1 and 0 respectively.

In additional embodiments, when labeled opinion data from the target domain is available, the labeled data may be used to further increase accuracy of the sentiment classification. Even a limited amount of labeled data may be beneficial and improve the target classifier. The labeled data may be used by refining the objective function of the target classifier.

Using a Naïve Bayes classifier as an example, a Dirichlet prior may be used for parameters, and then the expectation of the parameters may be observed with respect to their posteriors. Particularly in Equation 1, in a category c the frequency of a term t in the labeled data of the source domain can be used as the parameter of the corresponding Dirichlet prior, referred as $f_{c,t}'$. The term frequency of t for posterior distribution can be represented as $f_{c,t}+f_{c,t}'$, where $f_{c,t}$ denotes the frequency of term t in category c in the labeled data of the target domain.

To balance the impact of labeled data of the target domain and the source domain for parameter estimation, this function may be used to calculate the frequency of term t in category c:

$\lambda f_{c,t} + (1-\lambda) f_{c,t}'$. $\lambda$ is a real number with value in range [0,1] used for tuning the impact of labeled data of the target domain and the source domain. The higher the value of $\lambda$ is, the greater an impact of target labeled data. In practice, it is may be better to set $\lambda$ to be larger than 0.5, although the values in the range [0,1] are appropriate.

Finally, the target classifier (now trained) may be used to classify opinion data in the target domain at the operation 618.

Additional Embodiments

Figure 7:
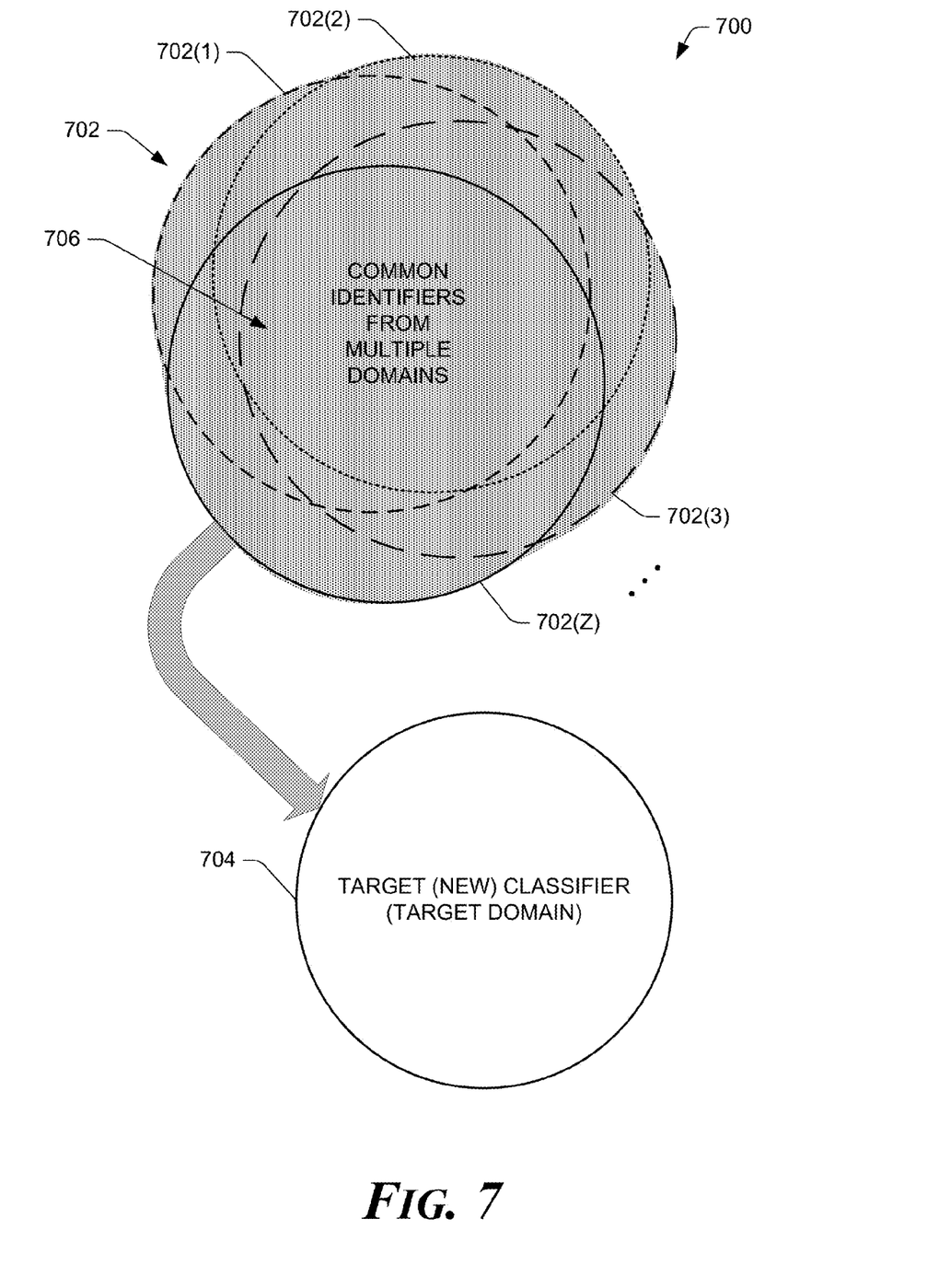
FIG. 7 shows an illustrative schematic of using common identifiers from multiple domains when training a target classifier for a target domain.

FIG. 7 shows an illustrative schematic 700 of using common identifiers from multiple domains 702 when training a target classifier 704 for a target domain. The multiple domains 702 may or may not share common attributes. For example, a first domain 702(1) may be for computers, a second domain 702(2) may be for books, a third domain 702(3) may be for video games, and a fourth domain 702(Z) may be for mobile telephones. Although some of the domains 702 may share attributes (e.g., computers and mobile telephones may share attributes such as speed, displays, batteries, etc.), other domains may be unrelated, such as the domain for books.

In accordance with embodiments, the common identifiers of the multiple domains 702 may be combined to create a pool of common identifiers 706. The pool of common identifiers 706 may be collectively larger than the common identifiers that are available from a single domain. The pool of common identifiers 706 may be imported to the target classifier 704, similar to the operation 404 of the process 400. Thus, the pool of common identifiers 706 may enable use of multiple out-of-domain common identifiers to increase the sentiment classification ability of the target classifier.

Figure 8:
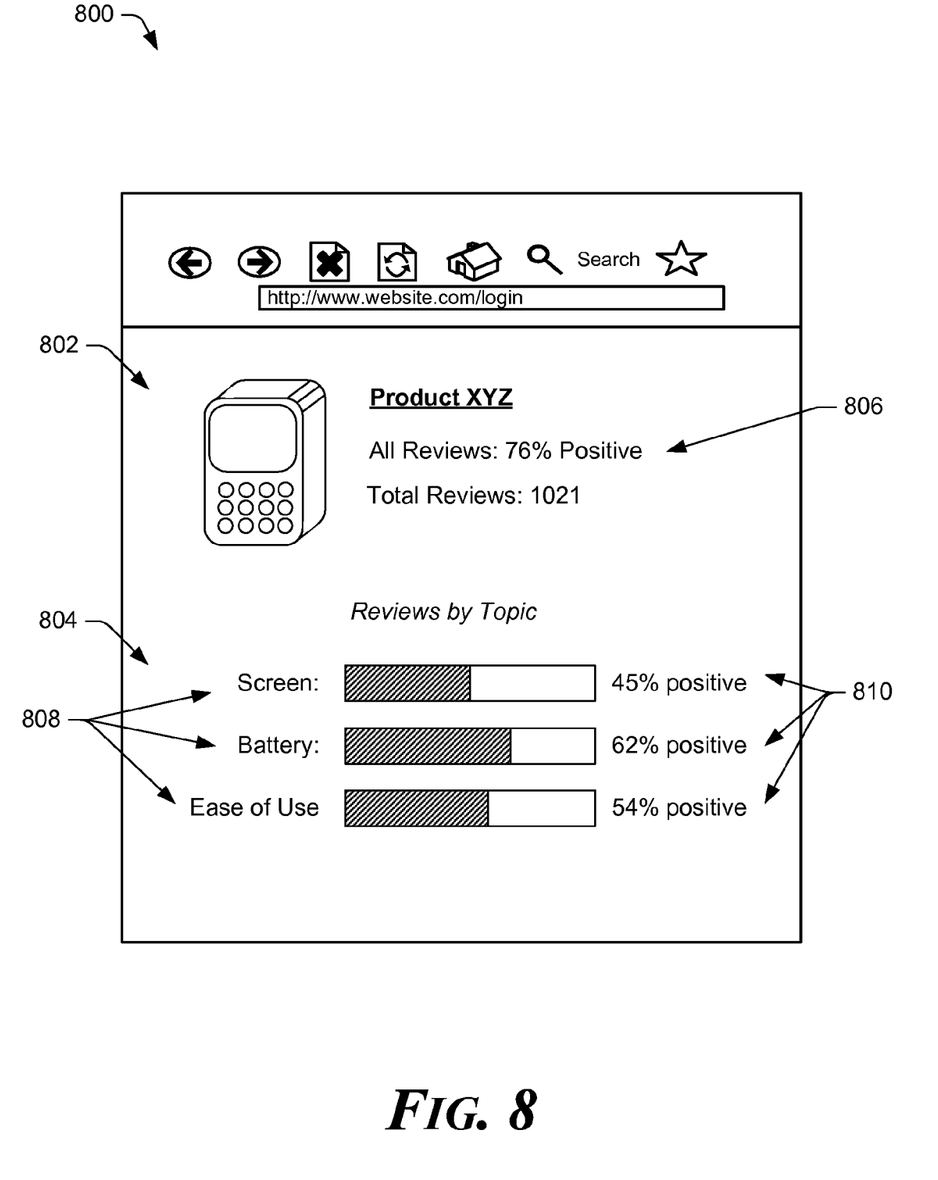
FIG. 8 shows an illustrative user interface for viewing categorized opinion data resulting from a trained classifier.

FIG. 8 shows an illustrative user interface 800 for viewing categorized opinion data resulting from a trained classifier. The user interface 800 includes a first section 802 and a second section 804, each providing sentiment classification of opinion data for a particular domain. For example, first section 802 may indicate the domain is for a mobile telephone. A sentiment summary 806 may be displayed to show the percentage of opinion data (e.g., reviews, etc.) that are positive and the total number of reviews. However, other arrangements of data may be provided in the first section 802 to show a summary of the sentiment classification that results from using a trained classifier to analyze opinion data as disclosed herein.

The second section 804 may include an additional break out 808 of information (e.g., sub-domain data, etc.). The break out 808 may include sentiment classification at a more granular level than the sentiment summary 806. In additional embodiments, more of fewer break outs 808 may be included, and may vary depending on the domain. For example, a domain for computers may include a different break 808 out than a domain for books.

Illustrative Computing Device

Figure 9:
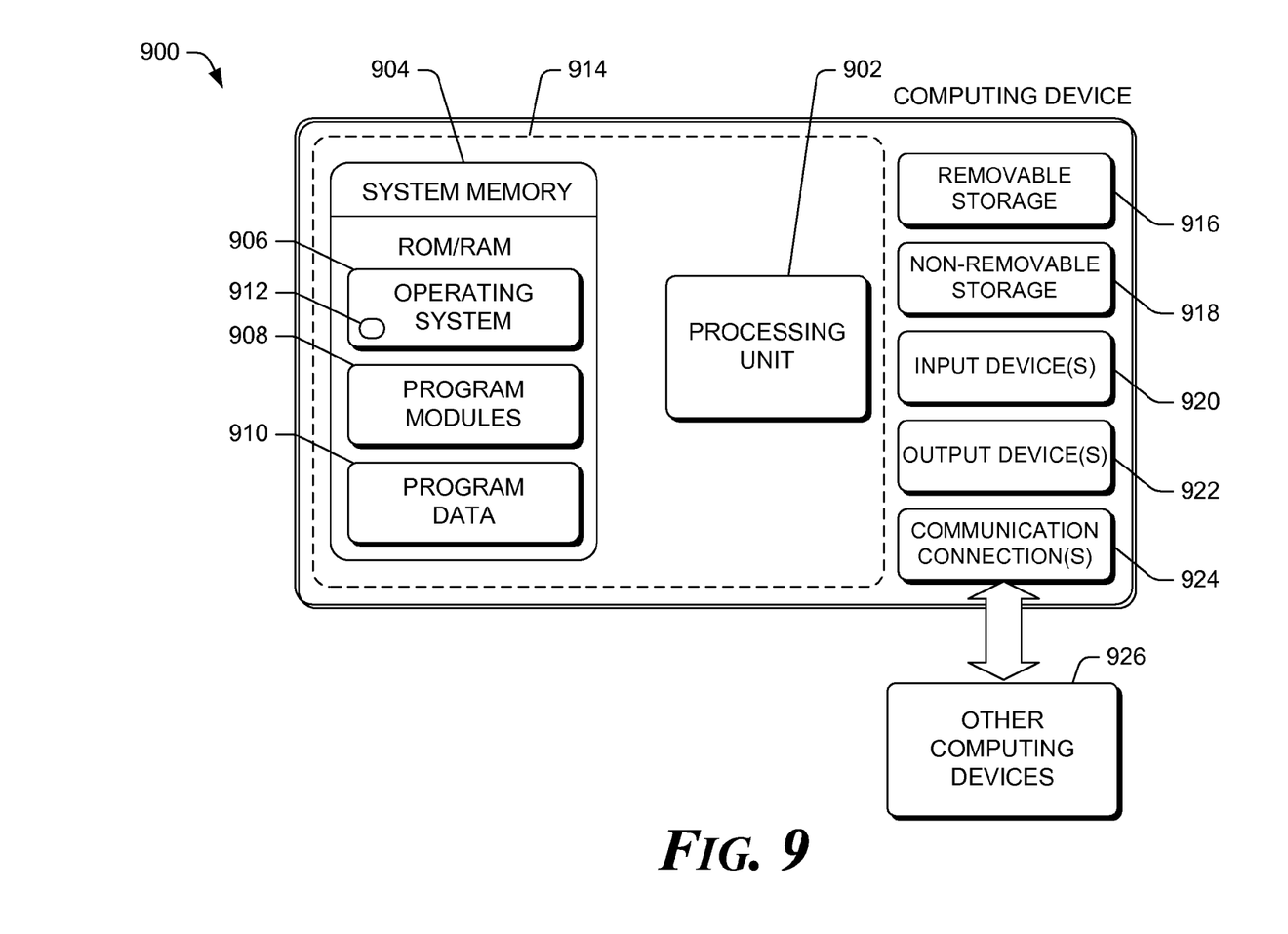
FIG. 9 shows an illustrative computing system that may be used to implement the classification of sentiment data in the process of FIG. 6.

FIG. 9 shows an illustrative computing device 900 that may be used to implement the classification of sentiment data described herein. It will readily be appreciated that the various embodiments of the sentiment classification techniques and mechanisms may be implemented in other computing devices, systems, and environments. The computing device 900 shown in FIG. 9 is only one example of a computing device and is not intended to suggest any limitation as to the scope of use or functionality of the computer and network architectures. The computing device 900 is not intended to be interpreted as having any dependency or requirement relating to any one or combination of components illustrated in the example computing device.

In a very basic configuration, the computing device 900 typically includes at least one processing unit 902 and system memory 904. Depending on the exact configuration and type of computing device, the system memory 904 may be volatile (such as RAM), non-volatile (such as ROM, flash memory, etc.) or some combination of the two. The system memory 904 typically includes an operating system 906, one or more program modules 908, and may include program data 910. The operating system 906 includes a component-based framework 912 that supports components (including properties and events), objects, inheritance, polymorphism, reflection, and provides an object-oriented component-based application programming interface (API). The computing device 900 is of a very basic configuration demarcated by a dashed line 914. Again, a terminal may have fewer components but will interact with a computing device that may have such a basic configuration.

The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 916 and non-removable storage 918. Computer storage media may include volatile and non-volatile, removable and non-removable media implemented in any method or technology for storage of information, such as computer readable instructions, data structures, program modules, or other data. The system memory 904, the removable storage 916, and the non-removable storage 918 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 900. Any such computer storage media may be part of the computing device 900. The computing device 900 may also have input device(s) 920 such as keyboard, mouse, pen, voice input device, touch input device, etc. Output device(s) 922 such as a display, speakers, printer, etc. may also be included. These devices are well known in the art and are not discussed at length here.

The computing device 900 may also contain communication connections 924 that allow the device to communicate with other computing devices 926, such as over a network. These networks may include wired networks as well as wireless networks. The communication connections 924 are one example of communication media. The communication media may typically be embodied by computer readable instructions, data structures, program modules, etc.

It is appreciated that the illustrated computing device 900 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 900 may be implemented in a cloud computing environment, such that resources and/or services are made available via a computer network for selective use by client devices.

CONCLUSION

The above-described techniques pertain to sentiment classification of out of domain data. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method, comprising:
matching, by a processor, a trained classifier associated with a first domain to a target classifier associated with a second domain, the matching being based at least in part on identifying a common attribute between the trained classifier and the target classifier;
selecting an identifier from the trained classifier, the identifier being a predictor of a sentiment of textual data; and
associating the identifier with the target classifier, the target classifier being configured to categorize the textual data within the second domain using the identifier.

2. The method of claim 1, wherein the textual data is opinion data that is posted on the Internet.

3. The method of claim 1, further comprising analyzing terms in the textual data in view of a known sentiment of the textual data, wherein terms having a relatively high correlation with the known sentiment are selected as additional identifiers, and associating the additional identifiers with the target classifier.

4. The method of claim 3, wherein the known sentiment is available for a limited amount of opinion data.

5. The method of claim 3, wherein the identifier and the additional identifiers are common identifiers that have a relatively high correlation with the sentiment of the textual data across multiple domains.

6. The method of claim 1, further comprising:
matching an additional trained classifier associated with a third domain to the target classifier;
selecting an additional identifier from the additional trained classifier; and associating the additional identifier with the target classifier.

7. One or more memory devices storing computer-executable instructions that, when executed on one or more processors, performs acts comprising:
selecting at least two source domains, each source domain including a trained classifier associated therewith, the at least two source domains being used to assist in training a target classifier associated with a target domain;
selecting common identifiers from each trained classifier in each of the at least two source domains, the common identifiers having sentiment predictive capability of opinion data across multiple domains;
importing the common identifiers from each trained classifier to the target classifier; and
categorizing the opinion data with the target classifier within the target domain using the common identifiers.

8. The one or more memory devices as recited in claim 7, wherein the acts further comprise outputting the opinion data as a sentiment summary of the opinion data.

9. The one or more memory devices as recited in claim 7, wherein the common identifiers are determined by comparing identifiers of the at least two source domains to additional identifiers of at least one other domain, the common identifiers being identifiers that have sentiment predictive capability of opinion data between the at least two source domains and the at least one other domain.

10. The one or more memory devices as recited in claim 7, wherein the acts further comprise:
evaluating an accuracy of the common identifiers by using the common identifiers to categorize opinion data with a known sentiment; and
removing a subset of the common identifiers that do not accurately predict the known sentiment.

11. The one or more memory devices as recited in claim 7, wherein the acts further comprise selecting additional common identifiers from at least one other source domain and importing the additional common identifiers to the target classifier.

12. The one or more memory devices as recited in claim 11, wherein the selecting of the common identifiers is based at least in part on an accuracy of the common identifiers in categorizing the opinion data by sentiment.

13. The one or more memory devices as recited in claim 7, wherein the opinion data is human-generated and made for consumption via the Internet.

14. A method, comprising:
selecting, by a processor, a trained classifier associated with a source domain to train a target classifier associated with a target domain, the trained classifier comprising identifiers that are used to predict a sentiment of opinion data of the source domain; and
populating the target classifier with at least one of the identifiers, the target classifier being configured to classify opinion data of the target domain using the identifiers.

15. The method of claim 14, further comprising:
obtaining the opinion data of the source domain, the opinion data being labeled with a known sentiment;
analyzing a portion of the opinion data with respect to the known sentiment; and
populating the target classifier with the portion of the opinion data when the portion of the opinion data is determined to be an accurate predictor of the known sentiment.

16. The method of claim 14, further comprising:
sorting the opinion data of the target domain into groups based at least in part on the occurrence of a particular identifier in the opinion data, wherein the particular identifier is labeled with a known sentiment;
creating an additional identifier based at least in part on the occurrence of a term that is used a predefined number of times in one of the groups; and
assigning the known sentiment to the additional identifier.

17. The method of claim 16, further comprising assigning a first weight to the identifiers and a second weight to the additional identifier.

18. The method of claim 17, wherein the first weight is greater than the second weight.

19. The method of claim 14, wherein the opinion data includes at least one of a customer review, a blog entry, or a forum entry.

20. The method of claim 14, wherein selecting the trained classifier to train the target classifier includes selecting the source domain from multiple domains, and wherein the selecting is based at least in part on the identification of a common attribute between the source domain and the target domain.

* * * * *